United States Patent Office 3,616,672
Patented Nov. 2, 1971

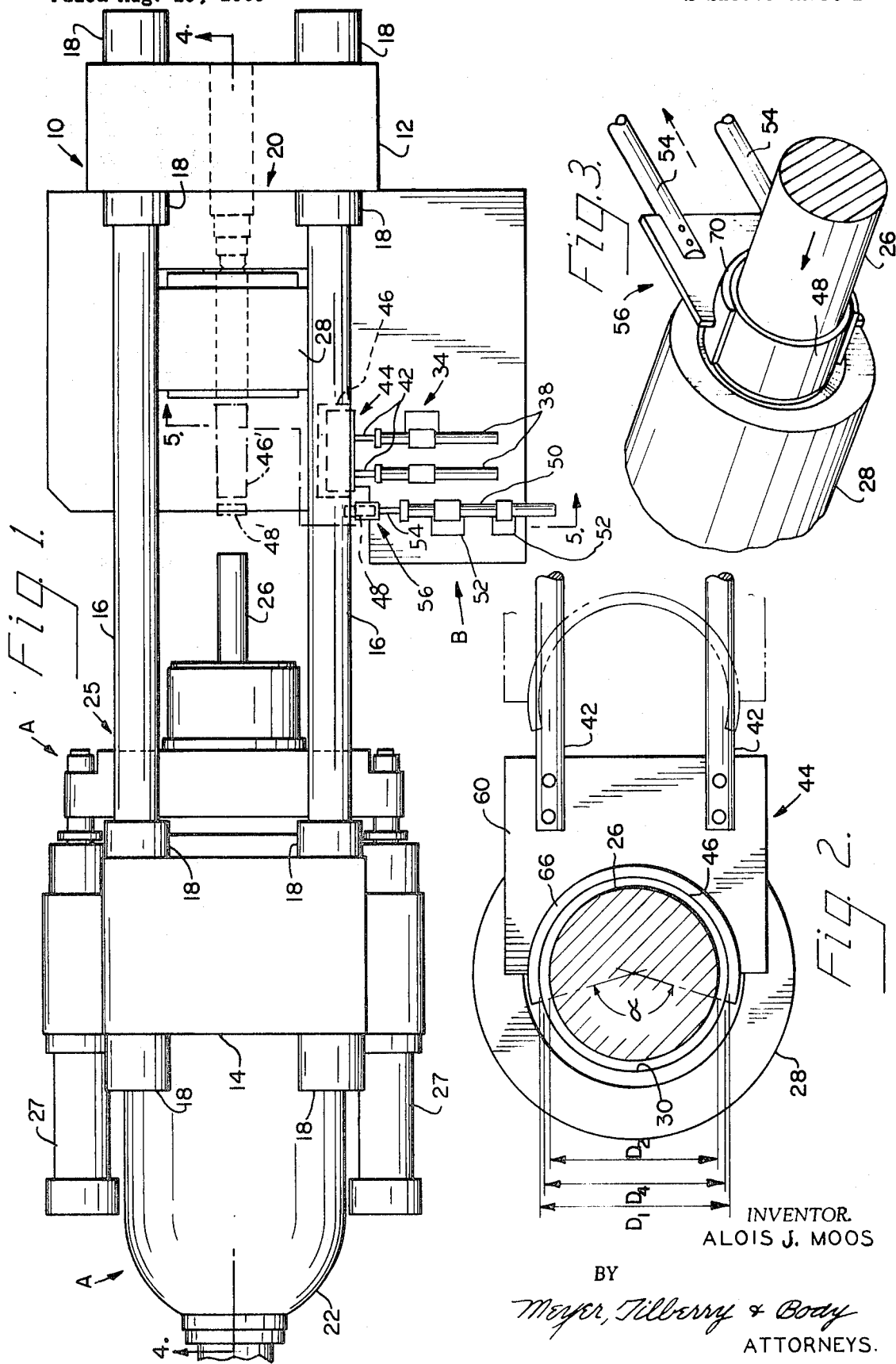

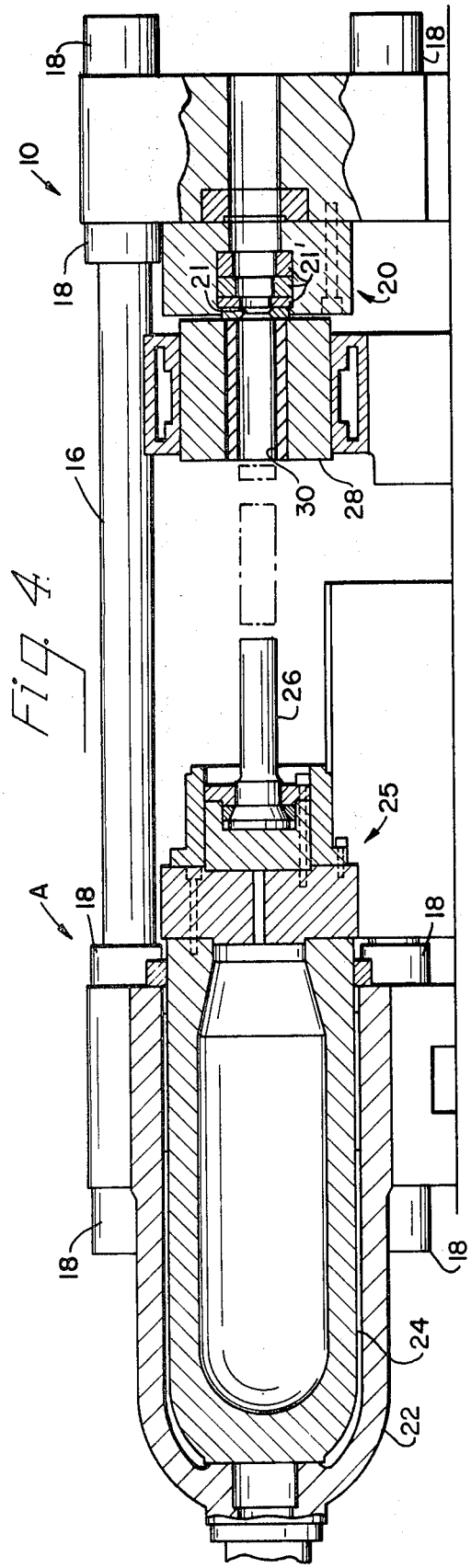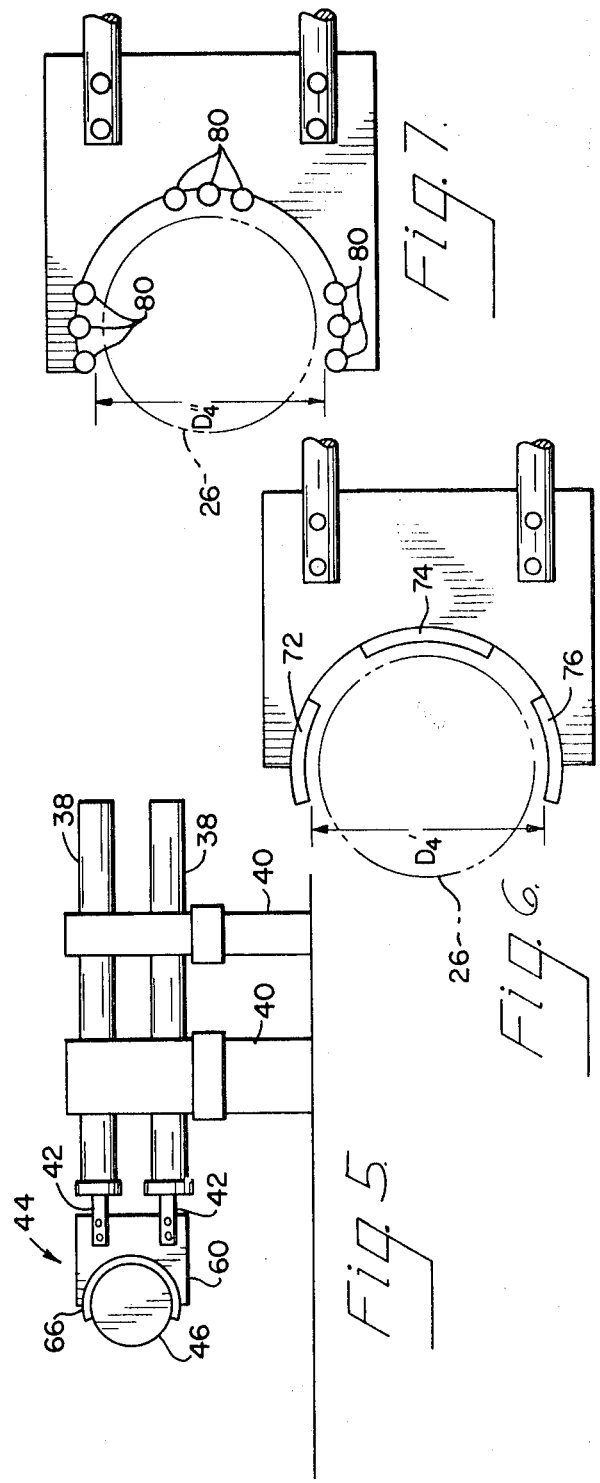

3,616,672
DUMMY BLOCK AND/OR BILLET LOADING DEVICE FOR EXTRUSION PRESSES
Alois J. Moos, Kew Gardens, N.Y., assignor to Gulf + Western Industrial Products Company, Grand Rapids, Mich.
Filed Aug. 19, 1969, Ser. No. 851,194
Int. Cl. B21c 33/00; B21j 13/10
U.S. Cl. 72—270                          7 Claims

ABSTRACT OF THE DISCLOSURE

The drawings show a long stroke extrusion press provided with mechanisms for supplying dummy blocks and billets to the pressure container. The mechanisms include tubular, open ended, holder assemblies having an internal diameter to receive the billets or dummy blocks. The holders are open along one side throughout an arcuate or circumferential extent of slightly less than 180° to maintain billets or dummy blocks therein. However, the chordal extent of the opening is greater than the diameter of the press ram to permit the holder to retract over the ram.

---

The present invention is directed toward the metal working art and, more particularly, to an improved press feed mechanism.

The invention is especially suited for transferring billets and dummy blocks to extrusion presses and will be described with particular reference to a long-stroke extrusion press; however, it will be appreciated the invention is capable of broader application and could be used for feeding a variety of types of workpieces, etc. to other types of extrusion presses.

One common type of extrusion apparatus presently in use includes an elongated, open-ended pressure container having an extrusion die assembly associated therewith. A billet of the material to be extruded is positioned in the container. Thereafter, a dummy block is positioned in the container and an aligned ram is reciprocated against the dummy block to cause the material to be extruded through the die.

Normally, the mechanisms for transferring the dummy blocks and billets to the container have included a reciprocated or oscillated member provided with a relatively complex set of clamping jaws at its outer end. In operation, the billet was gripped by the jaws and moved into alignment with the container. The press ram was then actuated to engage the billet and move it into the container. The same procedure was used for positioning the dummy block.

As can be appreciated, the clamping jaws had to be released in a two step sequence at exactly the correct times and retracted out of the way of the ram cross-head. This required close control of the clamp jaw actuating mechanism and further complicated the system.

The present invention provides a highly simplified feed or handling device which overcomes the problems and permits the noted operations to be carried out without the need of complex clamping jaws or control mechanisms.

In accordance with the invention, the feed device includes a cylindrical open ended holder which has an internal diameter to closely receive the billet or dummy block. One side of the holder is open throughout its length and for a circumferential extent of slightly less than 180°. Consequently, the chordal width of the open side is such that it is slightly larger than the diameter of the ram and, of course, this resultant width is slightly less than the diameter of the billet or dummy block. In use, the holder, with a billet or dummy block positioned therein, can be moved into alignment with the ram and container bore and the ram actuated to slide the billet or dummy block into the bore. Of course, since the billet or dummy block is larger in diameter than the open side of the holder, it is not necessary that the holder apply any positive gripping forces as required by prior devices. Likewise, since the open side of the holder is greater in width than the diameter of the ram, the holder can be retracted directly away from the ram.

Accordingly, a primary object of the invention is the provision of an extrusion press feed mechanism which eliminates the need for jaw actuating mechanisms and complicated controls.

A further object is the provision of a mechanism of the type described which simplifies positioning of billets or dummy blocks in extrusion presses.

Yet another object is the provision of a feed mechanism wherein the billet or dummy block holder can be an open ended tube having one side cut away.

A still further object is the provision of an extrusion press feed or loader mechanism wherein the billets or dummy blocks can be positioned by a simple reciprocated or oscillated arm.

Still another object is the provision of a mechanism of the general type described which is easy and inexpensive to construct and highly reliable in operation.

These and other objects and advantages will become apparent from the following description when read in conjunction with the accompanying drawings wherein:

FIG. 1 is a plan view of a long stroke extrusion press provided with an improved billet and dummy block loading arrangement formed in accordance with a preferred embodiment of the present invention;

FIG. 2 is an enlarged elevational view showing the relationship between the billet holder, the press ram or pressing stem, and the pressure container;

FIG. 3 is a pictorial view showing the dummy block loading mechanism and the press ram;

FIG. 4 is a cross-sectional elevational view taken on line 4—4 of FIG. 1;

FIG. 5 is an elevational view taken on line 5—5 of FIG. 1; and

FIGS. 6 and 7 show modified forms of the billet or dummy block holder.

Referring more specifically to the drawings wherein the showings are for the purpose of illustrating preferred embodiments of the invention only and not for the purpose of limiting same FIGS. 1 and 4 show the overall arrangement of a relatively conventional long stroke extrusion press A provided with an improved dummy block and billet loading assembly B formed in accordance with the invention.

The details of extrusion press A forms no part of the present invention and have been illustrated merely for the purpose of showing one environment in which the dummy block and billet loading mechanism B is especially suited for operation. Specifically, as shown, the press A includes a frame 10 comprised of crossheads 12 and 14 rigidly interconnected by four relatively large diameter tie rods 16 and nuts 18. Carried by the crosshead 12 is the extrusion die assembly 20, which includes the usual die 21 and supporting members 21'. Although not shown, the assembly 20 normally includes means for shifting the dies out of the press for die changing, lubrication, etc.

Carried by crosshead 14 or, formed integrally therewith, is a large diameter, single acting hydraulic cylinder 22 which receives a piston 24 (see FIG. 4) which, at its right hand end, carries a moving crosshead assembly 25. An elongated cylindrical ram or pressing stem 26 is removably connected to the crosshead assembly. Ram 26 is, of course, aligned with the die and arranged to be reciprocated along a horizontal path from the first position shown solid to a second position where it is substantially in engagement with the die of the die assembly 20. The ram is reciprocated back to the first position by a pair of hydraulic cylinders 27 which are carried by frame crosshead 14 and have their piston rods connected to the ends of moving crosshead 25.

Positioned between the die assembly 20 and the ram 26 is a conventional pressure container 28 which has a central, horizontally extending, open ended bore 30. The bore 30 is, of course, aligned with both the ram and the die assembly 20. The container 28 functions receive the billet or workpiece to be extruded through the die and to resist the radial pressure forces generated within the workpiece during the extruding operation.

As previously discussed, prior to the present invention a relatively complex clamp jaw mechanism was commonly utilized to grip the workpiece or billet and move it into an aligned position intermediate the ram and the pressure container when the ram was in its first position. Thereafter, the ram was actuated toward the workpiece and the workpiece was driven longitudinally into the container opening. As can be appreciated, the clamp mechanism had to be closely controlled so that the upper jaw could release the billet while the lower jaw maintained support for the billet until it had been pushed into the bore by the ram. Thereafter, both jaws had to be opened fully and retracted over the ram prior to the approach of the ram crosshead. This as can be seen, required a relatively complex clamping mechanism and controls which were closely synchronized with the movement of the ram. The same mechanism, on one of a similar type was required for placement of the dummy block.

The present invention provides a highly simplified billet and/or dummy block loading arrangement which overcomes the above problems. Although the invention can take a variety of structural configurations, the preferred arrangement can best be understood by reference to FIGS. 1 through 4. As shown, the improved dummy block and billet loading or positioning assembly B preferably includes a billet loading mechanism 34 and a dummy block loading mechanism 56. These mechanisms could, of course, be of a variety of specific constructions and positioned in many different locations relative to the press A; however, they are shown as being mounted adjacent the press and generally in alignment with the space between the ram 26 and the container 28 when the ram is in its first or retracted position shown solid in FIG. 1. Specifically, as shown, the mechanism 34 includes power means in the form of fluid cylinders 38 which are mounted on suitable supports or foundations 40. Although only two fluid cylinders 38 are shown in FIG. 1, there are a second pair of cylinders positioned directly beneath those shown (see FIG. 5).

The cylinders 38 have the outer ends of their piston rods 42 connected to a billet holder assembly 44. Accordingly, with a billet 46 positioned in the holder 44, actuation of the cylinders 38 causes the billet to be moved from the holder loading position shown to a position wherein the billet is aligned with the ram 26 and container bore 30. This position is identified as 46'. After the billet is in position 46; the dummy block positioning mechanism 36 is actuated to bring a dummy block 48 into aligned relationship with the container and the ram. In general, although the mechanism 36 could be substantially different than mechanism 34, it is constructed similarly and includes a pair of horizontally positioned, fluid cylinders 50 which are carried from supports or foundations 52. The piston rods 54 of the cylinders 50 have their outer end portions connected to a dummy block holding device 56 which is arranged to hold the dummy block 48 in proper orientation for insertion into the bore 30 of container 28. Consequently, with the dummy block 48 in position in the holder 56 actuation of the cylinders 50 causes the dummy block to be moved from the loading position to the discharge position shown as 48'. In the discharge position the dummy block is, of course, aligned with the pressing stem 26 and container bore 30. Consequently, actuation of the cylinder 22 causes the dummy block and billet to be slid into position in the bore 30 by being moved longitudinally through the holders 56 and 44. Thereafter, the cylinders 50 and 38 are energized to retract the holders 56 and 44 out of the way of the ram crosshead 25.

Of particular importance to the invention is the arrangement of the billet and dummy block holders 44 and 56, respectively. These holders are arranged to eliminate the need for clamp actuated jaws and precise control of the movement of the actuating cylinders 38 and 50, respectively.

As will be appreciated from the subsequent description, these holders can be constructed in many ways; however, referring to FIGS. 2 and 5, the preferred construction for the billet holder assembly 44 is shown in detail. Specifically, the billet holder assembly 44 includes a support frame comprised of a pair of plates 60 which are pinned or otherwise positively connected to the outer ends of the piston rods 42. Supported by the plates 60 is a cylindrical, open ended, holder means which defines a billet receiving chamber having a diameter only slightly larger than the billet.

In order to eliminate the need for any clamping or unclamping mechanism this means is designed so as to take advantage of certain size differences between the ram, the billet, and the container. Referring to FIG. 2, the ram 26 is shown as having a maximum diameter $D_2$. The bore 30 of the container 28 has a diameter $D_1$ which, in most extrusion presses is at least an inch or more greater in diameter than the diameter of the ram 26. The present invention makes use of this relationship by arranging the holder means so it is completely open along one side throughout its length and throughout an arcuate extent of only slightly less than 180° as indicated by the alpha symbol in FIG. 2. Accordingly, the open chordal distance $D_4$ of the billet engaging means is less than the diameter $D_1$ of the billet but greater than the diameter $D_2$ of the ram 26. This billet holder arrangement can be achieved with a variety of specific billet holder constructions; however, in FIG. 2 the billet holder is defined by an elongated cylindrical tube 66 which is welded to the plates 60. As shown, member 66 has a central open diameter which is arranged to closely receive the billet 46. The circumferential extent of member 66 being slightly greater than 180° with the left hand side, as viewed in FIG. 2, being open throughout the remainder of the 360°. Accordingly, as can readily be seen, after the ram 26 has engaged the billet 46 and moved it to the container, the holder assembly can be retracted, and the tube 66 passes freely over the ram 26. However, as can be appreciated, the billet 46 is securely held from moving laterally out of the tube during movement of holder assembly 44 into aligned position with the ram and container. This is so, since the open portion of the holder 66 is less than the diameter of the billet. Consequently, this arrangement eliminates any need for jaw actuating mechanism, etc.

The dummy block holder assembly 56 is generally identical to the previously described billet holder assembly 44; however, as shown in FIG. 3, because the dummy block is of much shorter length than the billet, the holder assembly 56 includes a much shorter tubular portion 70. In all other particulars, however, holder 56 is the same in construction and mode of operation as the holder assembly 44.

Although the members which define the cylindrical billet or dummy block receiving chambers have been shown and described as tubular members (i.e., 66 and 70), it is not necessary that these be continuous throughout their length or throughout their circumferential extent. For example, they can be formed from a plurality of discrete elements or sections.

Referring to FIGS. 6 and 7, two possible modifications of the billet or dummy block holder assemblies are shown. As shown in FIG. 6, the billet or dummy block engaging portion of the holder comprises three discrete arcuate sections 72, 74, and 76. These members are positioned so that the lateral open extent $D_4'$ of the internal surface is slightly less than the diameter of the billet or dummy block, but, greater than the maximum diameter of the ram.

In FIG. 7 the same general arrangement as that shown in FIG. 6 is provided; however, the billet or dummy block receiving chamber of the holder is defined by longitudinally extending cylindrical rods 80 which are positioned so as to closely engage the outer circumference of the dummy block or billet but, provide a laterally open side having a circumferential extent slightly less than 180° and a chordal open distance $D_4'$ which is less than the diameter of the dummy block or billet but greater than the diameter of the ram.

In addition to being discontinuous about the circumference, as shown in FIGS. 6 and 7, the chamber defining means could be discontinuous throughout the longitudinal extent. For example, the holder assembly could be comprised of two units of the type shown in FIG. 6 positioned in aligned relationship.

The invention has been described in great detail sufficient to enable one of ordinary skill in the press art to make and use the same. Obviously, modifications and alterations of the preferred embodiment will occur to others upon a reading and understanding of the specification and it is my intention to include all such modifications and alterations as part of my invention insofar as they come within the scope of the appended claims.

Having thus described my invention, I claim:

1. In an extrusion press including:
   a pressure container having a generally cylindrical, horizontally extending bore of a diameter $D_1$;
   an elongated cylindrical ram of a diameter $D_2$ which is less then $D_1$; and,
   means for mounting said ram for movement along a horizontal path between a first position where said ram is spaced from the bore and a second position where it enters said bore to extrude material from said container;
   the improvement comprising improved feed means for supplying cylindrical members of a diameter $D_3$ to said bore, $D_3$ being larger than $D_2$ but slightly smaller then $D_1$; said improved feed means comprising:
   first means defining a cylindrical, open ended holder having an internal open diameter slightly greater than $D_3$ and having member engaging surfaces extending between its ends and at least at spaced points throughout a circumferential extent of slightly more than 180°, the remaining circumferential portions of said holder being open and the chordal distance across said open portion being less then $D_3$ but greater than $D_2$; and, second means for supporting and moving said holder between a loading position spaced from said path to a discharge position axially aligned with said path and between the first position of said ram and said container whereby when said holder is in said discharge position movement of said ram to said second position will cause a member in said holder to be moved into said bore, said open circumferential portion of said holder permitting said holder to thereafter be retracted transversely away from said ram even though said ram is in said second position.

2. The improvement of claim 1 wherein said holder comprises a tube member.

3. The improvement of claim 1 wherein said holder comprises a frame member supporting a plurality of longitudinally extending members which define said engaging surfaces.

4. The improvement of claim 1 wherein said second means moves said holder through a plane extending perpendicular to said path.

5. The improvement of claim 1 wherein said second means moves said holder perpendicularly to said path and wherein said holder is supported with its open side parallel with said path.

6. The improvement as defined in claim 1 including second holders positioned in side-by-side relationship with said first holder.

7. The improvement as defined in claim 1 wherein said holder is continuous.

References Cited

UNITED STATES PATENTS 2,743,811  5/1956  Delcroix  72—270

FOREIGN PATENTS 627,754  9/1961  Canada  72—270

CHARLES W. LANHAM, Primary Examiner

R. M. ROGERS, Assistant Examiner

U.S. Cl. X.R.

72—420